United States Patent [19]
Shelstad

[11] Patent Number: 5,778,908
[45] Date of Patent: Jul. 14, 1998

[54] VEHICLE WHEEL WASHING DEVICE

[76] Inventor: Richard J. Shelstad, 37352 S. Blackfoot Dr., Tucson, Ariz. 85737

[21] Appl. No.: 780,207

[22] Filed: Jan. 8, 1997

Related U.S. Application Data

[60] Provisional application No. 60/009,882 Jan. 11, 1995.

[51] Int. Cl.[6] .................................................... B60S 3/04
[52] U.S. Cl. .......................................................... 134/123
[58] Field of Search ........................ 134/45, 123; 15/53.3, 15/53.4

[56] References Cited

U.S. PATENT DOCUMENTS

| | | | |
|---|---|---|---|
| 3,448,717 | 6/1969 | Kuhlman | 134/45 X |
| 3,667,486 | 6/1972 | Cole et al. | 134/45 |
| 4,830,033 | 5/1989 | Hanna | 134/45 |
| 4,985,957 | 1/1991 | Belanger et al. | 15/53.3 |
| 5,125,981 | 6/1992 | Belanger et al. | 134/18 |
| 5,341,828 | 8/1994 | Ferguson, Sr. | 134/123 |

FOREIGN PATENT DOCUMENTS

| | | | |
|---|---|---|---|
| 1275393 | 8/1968 | Germany | 134/45 |

*Primary Examiner*—Philip R. Coe
*Attorney, Agent, or Firm*—Michael Best & Friedrich LLP

[57] ABSTRACT

The vehicle wheel washing device includes spray nozzles located on the opposite sides of the washing bay of a vehicle washing facility for directing a cleansing fluid onto the driver and passenger side wheels as a vehicle travels through the washing zone, and an elongated, resilient tubular compression member located in the washing zone and extending transversely of the travel path of the vehicle on one side of the vehicle. The fluid flow system is arranged so that, as the compression member is squashed by a vehicle wheel rolling thereover, cleansing fluid is pumped from the compression member through the spray nozzles and, as a compression member returns towards the normal shape, cleansing fluid is siphoned from the tank to refill the compression member for the next pumping cycle. A pair of springs diametrically opposed relative to and spaced from the longitudinal axis of the compression member assists in returning it to its normal position and, if the compression member is twisted as a vehicle wheel rolls thereover, also assists in untwisting it. In an alternate embodiment the fluid flow system is arranged so that the device can be programmed to apply the cleansing fluid to selected vehicles.

11 Claims, 4 Drawing Sheets

VEHICLE WHEEL WASHING DEVICE

RELATED U.S. APPLICATION

This is a continuation of Provisional Application Ser. No. 60/009,882, entitled ("A Wheel Cleaning Apparatus for Use in Automatic Car Washes" and filed Jan. 11, 1995.

BACKGROUND OF THE INVENTION

This invention relates to devices for washing vehicle wheels, and more particularly, to devices for applying a cleansing fluid to vehicle tires and rims as a vehicle moves through the washing bay or zone of a vehicle washing facility.

Vehicle washing facilities have employed different approaches for applying a cleansing fluid, such as a strong detergent and/or a mild acid, to vehicle wheels for cleaning the tires and rims. In one approach, a cleansing fluid is applied by one or more attendants manually spraying the vehicle wheels with a low pressure jet of water containing the cleansing fluid from a wand.

Devices for automatically applying a cleansing fluid typically include relatively complicated mechanisms including pumps, pressurized air, pressure regulators, timers, flow controls and the like with the attendant manufacturing costs and maintenance problems. Examples of such devices are disclosed in Hanna U.S. Pat. No. 4,830,003, Belanger et al. U.S. Pat. No. 4,985,957, Belanger et al. U.S. Pat. No. 5,125,981 and Ferguson U.S. Pat. No. 5,341,828.

SUMMARY OF THE INVENTION

An object of this invention is to provide a device for applying cleansing fluid to the wheels of a vehicle travelling along a path through a washing zone which includes a minimum number of moving parts and yet is capable of consistently applying a uniform amount of the cleansing fluid.

Another object of the invention is to provide such a device which does not require pumps, a pressurized gas or any electrical power.

A further object of the invention is to provide such a device which does not require a timer or motion sensor to initiate and terminate application of the cleansing fluid.

Other objects, aspects and advantages of the invention will become apparent to those skilled in the art upon reviewing the following detailed description, the drawings and the appended claims.

The invention provides a device for applying a cleansing fluid to the wheels of the vehicle travelling along a path through a washing zone including sprayer means located on at least one side, preferably both sides, of the washing bay for directing the cleansing fluid onto the vehicle wheels as it travels through the washing zone, an elongated, resilient tubular compression member located in the washing zone and extending transversely to the travel path of the vehicle wheels on one side of the vehicle and a fluid flow system connecting the compression member in fluid communication with a source of the cleansing fluid, such as a reservoir or tank, and the sprayer means. The fluid flow system is arranged such that, when the compression member is in a ready position in its normal shape and at least partially filled with the cleansing fluid and a vehicle wheel rolls thereover, the compression member is squashed to a compressed condition and causes the cleansing fluid to be pumped through the sprayer means and, as the compression member returns from a compressed condition to a ready condition after a vehicle wheel has rolled thereover, cleansing fluid is drawn from the source back into the compression member.

Flow blocking means are provided for preventing back flow of the cleansing fluid into the supply tank during the pumping cycle and preventing air from being sucked back through the spray nozzles during the withdrawal or siphoning cycle. In one embodiment, such means includes one-way check valves in the fluid flow system down stream of the source of the cleansing fluid and upstream of the sprayer means.

In one embodiment, the return of the compression member from a compressed condition to a ready condition is assisted by a spring connected between one end of the compression member and a stationary support. Preferably a pair of springs diametrically opposed relative to and radially spaced from the longitudinal axis of the compression member are used so that, in the event the compression member is twisted as a vehicle wheel rolls thereover, the springs assist in untwisting the compression member as well as returning it to a ready condition.

In an alternate embodiment, the fluid flow system is arranged so that the device can be programmed to apply a cleansing fluid to selected vehicles.

DESCRIPTION OF THE PREFERRED EMBODIMENTS

Figure 1:
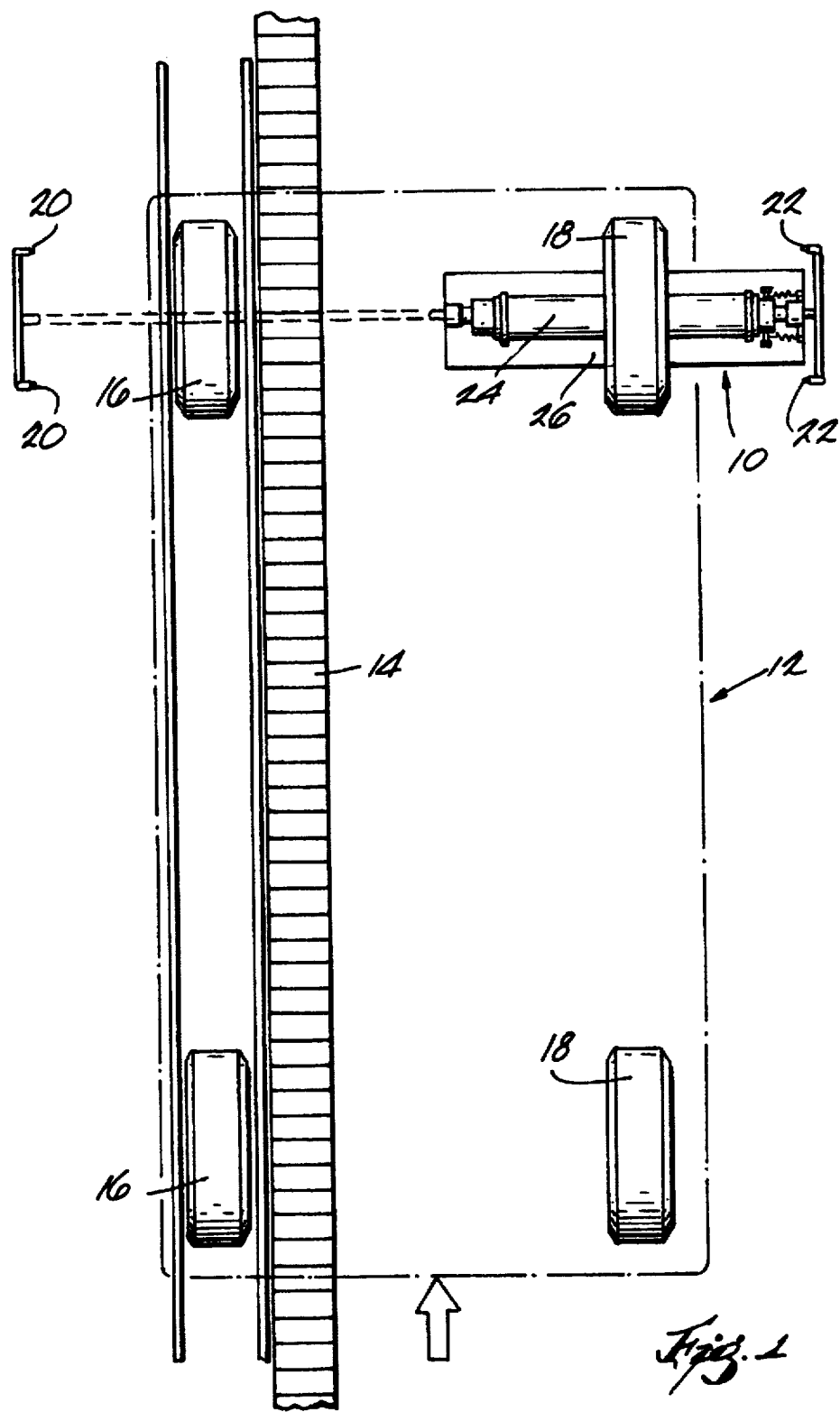
FIG. 1 is a partially diagrammatic representation of the washing zone in a vehicle washing facility including a wheel washing device of the invention.

FIG. 1 illustrates vehicle wheel washing device 10 embodying the invention installed in the washing bay or zone 12 of a vehicle washing facility including a conventional conveyor 14 for pulling a vehicle along a travel path through the washing zone 12. Only the driver side wheels 16 and the passenger side wheels 18 of the vehicle are illustrated. The conveyor 14 engages the driver side wheels 16 in a conventional manner.

The wheel washing device 10 includes a pair of spray nozzles 20 located on the driver side of the vehicle and a pair of spray nozzles 22 located on the passenger side of the vehicle. The spray nozzles 20 and 22 are spaced apart in the direction of vehicle travel and are located at an elevation of the vehicle wheels and aimed to direct a flow of cleansing fluid onto the tire and rim of a passing wheel.

The wheel washing device 10 includes an elongated, resilient, tubular compression member 24 which extends transversely of the vehicle travel path on the passenger side of the vehicle and is located so that the passenger side wheels 18 roll over it as the vehicle moves into the vicinity of the spray nozzles 20 and 22.

The compression member 24 is made from a durable, resilient material, preferably an elastomeric material, which is capable of being collapsed or compressed under the weight of a vehicle wheel rolling over it and thereafter returning to its normal shape. As a guide, the compression member 24 can be made from a durable, reinforced synthetic rubber tubing having an inside diameter of about 2 inches and an outside diameter of about 2½ inches and have a length of about 36 inches.

The compression member 24 is supported on the floor 25 of the washing facility by a base plate 26 suitably affixed to the floor 25. Extending into and secured to one end 28 of the compression member 24 is an adapter 30 including a hollow sleeve portion 28 which is slidably and rotatably received in a sleeve housing 34 mounted on the base plate 26. Extending into and secured to the other end 36 of the compression member 24 is a coupling 38 having a hollow sleeve portion 40 received by a bracket 42 mounted on the base plate 26. The sleeve portion 40 of the coupling 38 is suitably held in place inside the bracket 42, such as by one or more bolts 44 tightened into engagement with the outer surface of the sleeve portion 40. In the specific embodiment illustrated, the adapter 30 and the coupling 38 are secured to the opposite ends of the compression member 24 by conventional hose clamps 45.

In accordance with the invention, the compression member 24 is connected to the spray nozzles 20 and 22 and the tank 46 via a fluid flow system which is arranged so that, as the compression member 24 is squashed when a passenger side wheel 18 rolls thereover, cleansing fluid is "pumped" or forced through to the spray nozzles 20 and 22 and, as the compression member 24 returns to a ready condition in its normal shape, cleansing fluid is "siphoned" or withdrawn from the tank 46 to refill the compression member 24.

More specifically, the passenger side spray nozzles 22 are mounted on elbow fittings 48 connected to a T-fitting 50 via relatively rigid tubes 52. A T-fitting 54 is connected in fluid communication with the sleeve portion 32 of the adapter 30. The end 28 of the compression member 24 is connected in fluid communication with the passenger side spray nozzles 22 by a first conduit 56 including a tube 58 connected between the T-fittings 50 and 54.

The driver side spray nozzles 20 are mounted on elbow fittings 60 connected to a T-fitting 62 via relatively rigid tubes (not shown) similar to tubes 52 for the passenger side nozzles 22. The T-fitting 62 is supported on a bracket 64 mounted on the floor 25 of the washing facility at a location where the driver side spray nozzles 22 are generally directly opposite to the passenger side spray nozzles 20. The other end 36 of the compression member 24 is connected in fluid communication with the driver side spray nozzles 22 by a second conduit 66 including a tube 68 connected at one end to the coupling 38, extending under the conveyor 14 and connected to the T-fitting 62 via an elbow fitting 70 and a tube 72. The end 28 of the compression member 24 is connected in fluid communication with the tank 46 by a third conduit 74 including a tube 76 connected to the T-fitting 54.

When in a ready condition, the compression member 24 is in its normal circular cross sectional shape and at least substantially filled with cleansing fluid. AS a passenger side vehicle wheel 18 rolls over the compression member 24, it is squashed or compressed, causing cleansing fluid to be pumped therefrom. A portion of the cleansing fuel in the compression member 24 to the right of the passenger side wheel 18 as viewed in FIG. 2 flows through the first conduit 56 and forces cleansing fluid out through the passenger side spray nozzles 22. Another portion of the cleansing fluid in the compression member 24 to the left of the passenger side wheel 18 as viewed in FIG. 2 flows through the second conduit 66 and forces cleansing fluid out through the driver side spray nozzles 20.

As the compression member returns to its normal shape after a vehicle wheel has rolled thereover, cleansing fluid is "siphoned" or withdrawn from the tank 46 to refill the compression member 24. Although not essential, the tank 46 preferably is located at an elevation above the compression member 24, e.g., at least 12 inches, to enhance this siphoning action.

Flow blocking means preferably are provided for preventing back flow of the cleansing fluid into the tank 46 during the pumping cycle and preventing air from being sucked back through the spray nozzles 20 and 22 during the siphoning cycle. In the specific instruction illustrated, such means includes a first one-way check valve 78, which permits fluid flow in the direction of the arrow 80 (FIG. 2), and prevents fluid flow in the opposite direction, in the first conduit 56 upstream of the passenger side spray nozzles 22, i.e., located between the T-fitting 50 and the tube 58, a second one-way check valve 82 which permits the fluid flow in the direction of the arrow 84 (FIG. 2) and prevents fluid flow in the opposite direction, in the second conduit 66 upstream of the driver side spray nozzles 20, i.e., located between the T-fitting 62 and the tube 72 and a third one-way check valve 86, which permits fluid flow in the direction of the arrow 88 (FIG. 22) and prevents fluid flow in the opposition direction, in the third conduit 74 down stream of the tank 46, i.e., located between the tank 46 and the T-fitting 54. All the check valves 78, 82 and 86 have a relatively low opening pressure, e.g., 2–5 psi.

The third conduit 74 preferably also includes a strainer 90 upstream of the third check valve 86 for preventing particulate material larger than a predetermined size from entering the fluid flow system.

During the pumping cycle, the first and second check valves 78 and 82 open to permit substantially free flow of the cleansing fluid through the first and second conduits 56 and 66, respectively, and the third check valve 86 prevents back flow of cleansing fluid into the tank 46. During the siphoning cycle, the first and second check valves 78 and 82 close to prevent air from being sucked back through the spray nozzles 22 and 20, respectively, and the third check valve 86 opens to permit substantially free flow of cleansing fluid from the tank 46 to the compression member 24.

Figure 2:
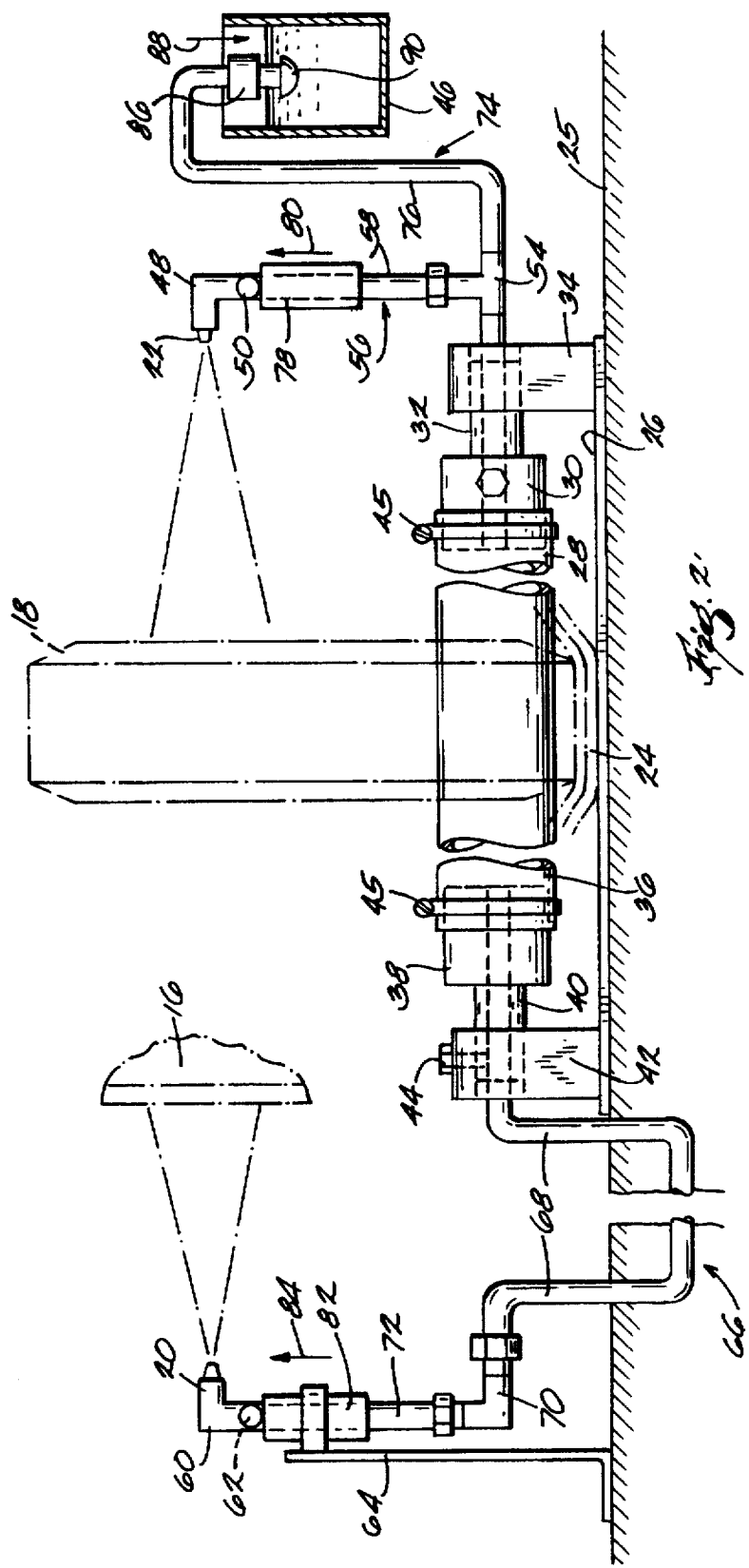
FIG. 2 is an enlarged, elevational, partially broken away, view of a wheel washing device shown in FIG. 1.
Figure 3:
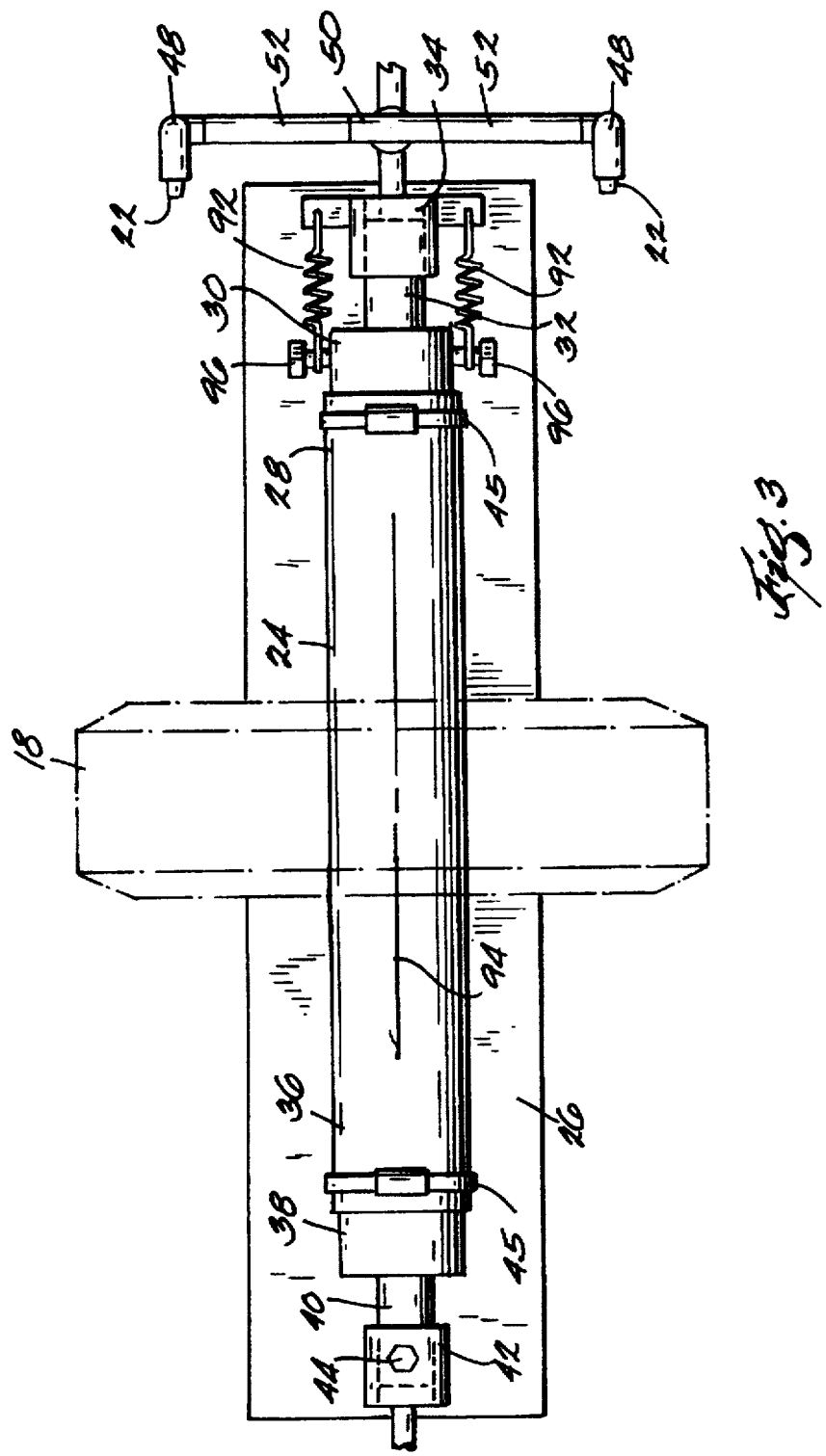
FIG. 3 is a top plan view of the compression member and passenger side spray nozzles shown in FIG. 2.

As the compression member 24 is squashed, it tends to shorten, i.e., move axially to the left as viewed in FIG. 2. This axial movement is accommodated by the slidable connection between the sleeve portion 32 of the adapter 30 and the sleeve housing 34. Return means preferably are provided to assist the compression member 24 in returning to its normal shape and a ready condition. In the specific embodiment illustrated, such means includes a pair of elongated springs 92, diametrically opposed relative to the longitudinal axis 94 (FIG. 3) of the compression member 24, spaced radially apart in the direction of vehicle travel and connected between the sleeve housing 34 and diametrically opposed bolts 96 extending radially outwardly from the adapter 32 as best shown in FIG. 3. As a passenger side wheel 18 rolls over the compression member 24, it tends to become slightly twisted in the rotational direction of the wheel. By virtue of being diametrically opposed relative to the longitudinal axis 94 of the compression member 24, the springs 92 assist in untwisting the compression member 24 as well as assist in returning it to its normal shape and a ready condition.

Figure 5:
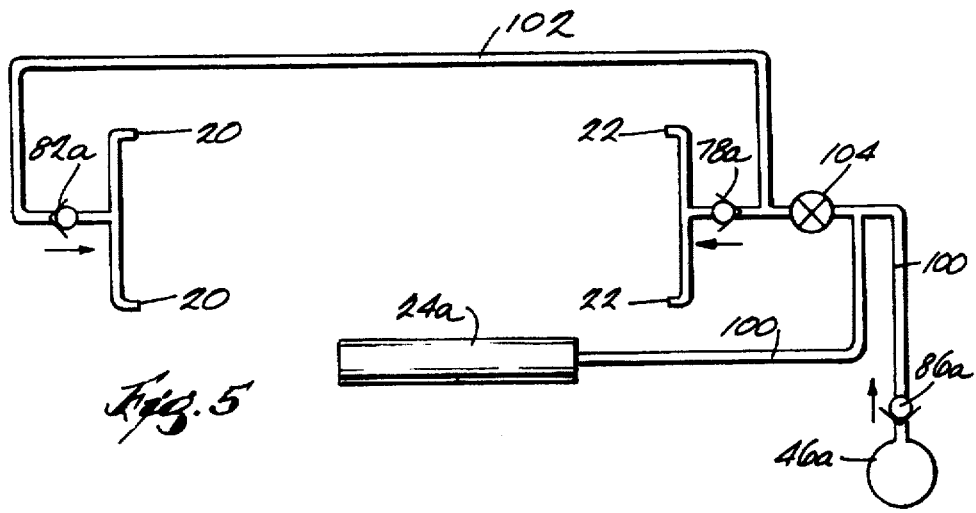
FIG. 5 is a diagrammatic representation of an alternate embodiment of the invention.
Figure 4:
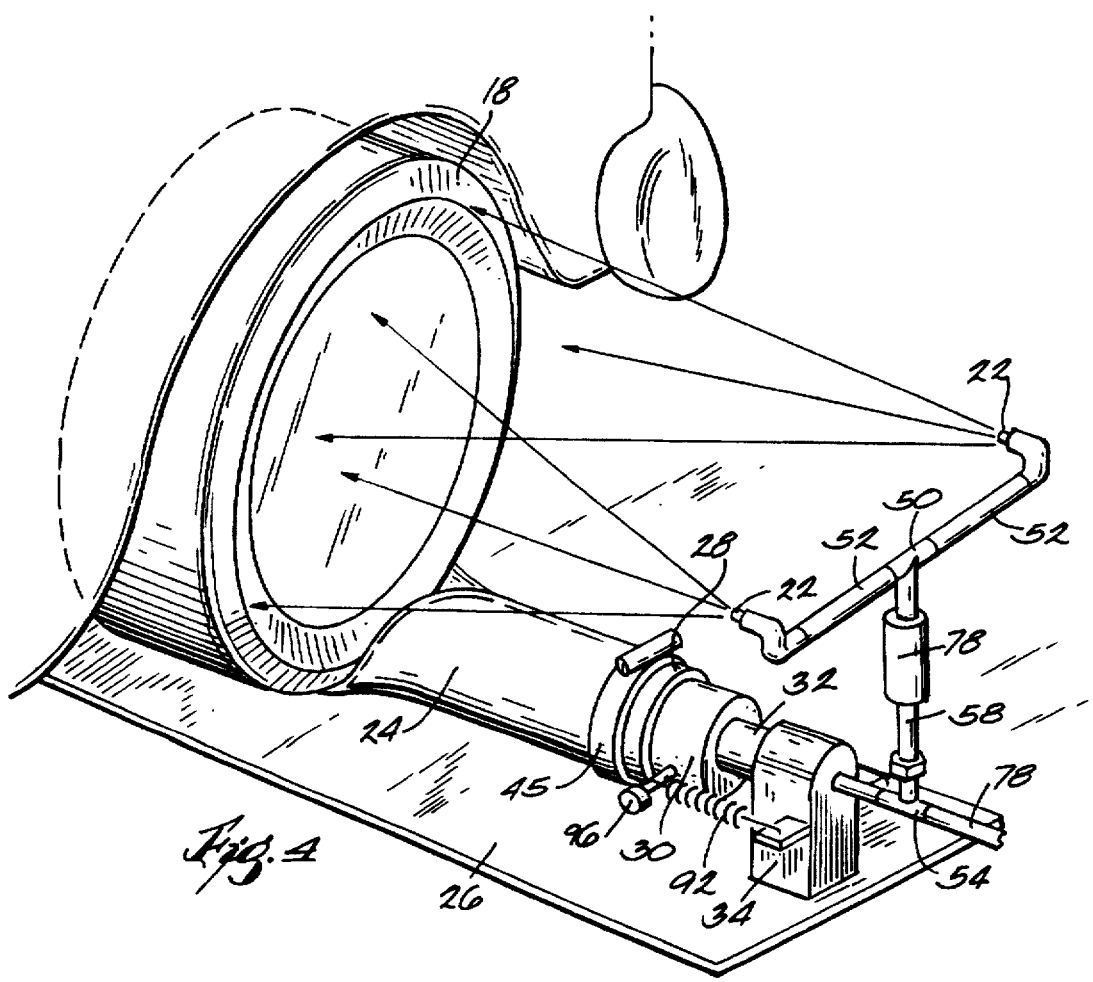
FIG. 4 is a perspective view of a portion of the compression member and the passenger side spray nozzles showing the compression member in a squashed or compressed condition.

FIG. 5 is a diagrammatic representation of an alternate embodiment which is arranged to permit the device to be programmed for optional application of cleansing fluid. In this embodiment, the compression member, the spray nozzles 20 and 22 and the fluid flow system is constructed and operated in substantially the same manner as is described above, except that the fluid flow system is connected to only one end of the compression member and the other end is capped. More specifically, the end 28a of the compression member 24a is connected in fluid communication with the tank 46a, by a first conduit 100 including a one-way check valve 86a and in fluid communication with the passenger and driver side spray nozzles 20 and 22 by a second conduit 102 connected to the first conduit 100 and including one-way check valves 78a and 82a. The check valves 78a, 82a and 86a operate in the manner described above.

Flow of cleansing fluid to the spray nozzles 20 and 22 is controlled by a normally closed solenoid-operated valve 104 in the second conduit 102. When the device is programmed to apply cleansing fluid, an electrical signal is transmitted to open the valve 104 and cleansing fluid is pumped from the compression member 24a to the spray nozzles 20 and 22 through the first conduit 100, the second conduit 102 and check valves 78a and 82a, while the check valve 86a prevents back flow of cleansing fluid into the tank 46a. As a compression member 24a returns to its normal shape, it is refilled with cleansing fluid as described above.

When the device is programmed not to apply cleansing fluid, there is no electrical signal to the normally closed valve 104 and it prevents flow of cleansing fluid to the spray nozzles 20 and 22. The compression member 24a remains filled with cleansing fluid in a ready condition for the next time the device is programmed to apply cleansing fluid.

The compression member and all other parts exposed to the cleansing fluid preferably are corrosion resistant and resistant to attack by solutions having a pH as low as about 4 and as high as about 14 so it can be used with both strong detergents and mild acids when desirable for brightening certain type rims.

Since the compression member usually is refilled with substantially the same amount of cleansing fluid during each refill cycle, substantially the same amount of cleansing fluid is applied to each passenger and driver side wheels each time the compression member is squashed by a passenger side wheel. The area of application is controlled by the location and sizing of the spray nozzles. Thus, the wheel washing device of the invention repeatedly applies a consistent amount of cleansing fluid to vehicle wheels without the need for pumps, pressurized air, pressure regulators, flow controls, timers, switches or electrical power for any reason. Also, the device does not include any mechanical linkages, hinges and the like and, therefore, requires very little maintenance and has reduced manufacturing and installation costs. In the event the compression member becomes permanently flattened during use, this can be easily rectified by simply loosening the clamps 45 on both ends, rotating the compression member 90° and re-tightening the clamps 45. In the event the compression member is permanently stretched during use, the bolts 44 on the bracket 42 can be loosened, the compression member 24 and coupling 38 moved to the left as viewed in FIG. 3 and the bolts 44 retightened to secure the compression member in the new stretched position. If necessary, the compression member can be removed after loosening the clamps 45 on both ends and a small portion cut off, e.g., 1 to 1½ inch, cut off one end and then re-installed.

From the foregoing description, one skilled in the art can easily ascertain the essential features and characteristics of the invention and, without departing from the spirit and scope thereof, make various changes and modifications to adapt it to various uses.

I claim:

1. A device for applying a cleansing fluid to the wheels of a vehicle travelling along a path through a washing zone comprising sprayer means located on at least one side of the washing zone for directing the cleansing fluid onto the vehicle wheels as it travels through the washing zone;

an elongated, resilient tubular compression member having a hollow interior, said compression member located in the washing zone and extending transversely of the travel path of the vehicle wheels on one side of the vehicle; and a fluid flow system connecting the interior of said compression member in fluid communication with a source of the cleansing fluid and with said sprayer means such that, when said compression member is in a ready condition in its normal shape and at least partially filled with the cleansing fluid and a vehicle wheel rolls thereover, said compression member is squashed to a compressed condition and causes the cleansing fluid to be pumped therefrom and through said sprayer means and, as said compression member returns from a compressed condition to a ready condition after a vehicle wheel has rolled thereover, cleansing fluid is drawn from the source into said compression member.

2. A device according to claim 1 including return means for assisting return of said compression member to a ready condition.

3. A device according to claim 2 wherein said compression member has opposed first and second ends; and said return means comprises spring means connected between one of said first and second ends of said compression member and a stationary support.

4. A device according to claim 3 wherein said compression member has a longitudinal axis and tends to be twisted as a vehicle wheel rolls thereover; and said spring means includes a pair of elongated springs having opposite ends which are connected to said one end of said compression member and the stationary support at locations generally diametrically opposed relative to and radially spaced outwardly from the longitudinal axis of said compression member and which untwists said compression member as it is returned to a ready condition.

5. A device according to claim 1 wherein said compression member has opposed first and second ends;

said sprayer means comprises first and second spray nozzles located on the opposite sides of the washing zone to spray cleansing fluid on the wheels on the driver and passenger sides of the vehicle; and said fluid flow system includes first conduit means connecting the first end of said compression member in fluid communication with said first spray nozzle, second conduit means connecting the second end of said compression member in fluid communication with said second spray nozzle, and third conduit means connecting the source of cleansing fluid in fluid communication with one of said first and second conduit means.

6. A device according to claim 5 wherein said first conduit means includes a first check valve for permitting fluid communication between said first spray nozzle and the first end of said compression member as said compression member is being squashed to a compressed condition and for preventing fluid communication between said first spray nozzle and the first end of said compression member as said compression member returns to the ready condition;

said second conduit means includes a second check valve for permitting fluid communication between said second spray nozzle and the second end of said compression member as said compression member is being squashed to a compressed condition and for preventing fluid communication between said second spray nozzle and the second end of said compression member as said compression member returns to the ready condition; and said third conduit means includes a third check valve for preventing fluid communication between the source of cleansing fluid and said one end of said compression member as said compression member is being squashed to a compressed condition and for permitting fluid communication between the source of the cleansing fluid and said one end of said compression member as said compression member returns to a ready condition.

7. A device according to claim 1 wherein said sprayer means comprises first and second spray nozzles located on opposite sides of the washing zone; and said fluid flow system includes first conduit means connecting said compression member in fluid communication with the source of cleansing fluid;

second conduit means connecting said first conduit means in fluid communication with said first and second spray nozzles; and valve means in said second conduit means selectively movable between open and closed positions to respectively permit and shut off flow of cleansing fluid from said compression member to said first and second spray nozzles.

8. A device according to claim 7 wherein said second conduit means includes first and second check valves for permitting fluid communication between said compression member and said first and second spray nozzles, respectively, as said compression member is being squashed to a compressed condition with said valve means in the open position and for preventing fluid communication between said compression member and said first and second spray nozzles as said compression member returns to a ready position with said valve means in the open position; and said first conduit means includes a third check valve for preventing fluid communication between the source of cleansing fluid and said compression member as said compression member is being squashed to a compressed condition with said valve means in the open position and permitting fluid communication between the source of cleansing fluid and said member as said compression member returns to a ready position with said valve means in the open position.

9. A device for applying a cleansing fluid to the wheels of a vehicle travelling along a path through a washing zone comprising first and second sprayer means located on the opposite sides of the washing zone for directing the cleansing fluid onto the wheels on the driver and passenger sides of the vehicle, respectively, as it travels through the washing zone;

an elongated, resilient tubular compression member having a hollow interior and opposed first and second ends, said compression member located in the washing zone and extending transversely of the travel path of the vehicle wheels on one side of the vehicle;

a fluid flow system connecting the interior of said compression member in fluid communication with a source of the cleansing fluid including first conduit means connecting the first end of said compression member in fluid communication with said first sprayer means, second conduit means connecting the second end of said compression member in fluid communication with said second sprayer means, and third conduit means connecting the source of cleansing fluid communication with one of said first and second conduit means such that, when said compression member is in a ready condition in its normal shape and at least partially filled with the cleansing fluid and a vehicle wheel rolls thereover, said compression member is squashed to a compressed condition and causes the cleansing fluid to be pumped therefrom and through said first and second sprayer means and as said compression member returns from a compressed condition to a ready condition after a vehicle wheel has rolled thereover, cleansing fluid is drawn from the source into said compression member; and spring means connected between one of said first and second ends of said compression member and a stationary support for assisting return of said compression member to a ready condition.

10. A device according to claim 9 wherein said first and second sprayer means comprises first and second spray nozzles;

said first conduit means includes a first check valve for permitting fluid communication between said first spray nozzle and the first end of said compression member as said compression member is being squashed to a compressed condition and for preventing fluid communication between said first spray nozzle and the first end of said compression member as said compression member returns to the ready condition;

said second conduit means includes a second check valve for permitting fluid communication between said second spray nozzle and the second end of said compression member as said compression member is being squashed to a compressed condition and for preventing fluid communication between said second spray nozzle and the second end of said compression member as said compression member returns to the ready condition; and said third conduit means includes a third check valve for preventing fluid communication between the source of cleansing fluid and said one end of said compression member as said compression member is being squashed to a compressed condition and for permitting fluid communication between the source of the cleansing fluid and said one end of said compression member as said compression member returns to a ready condition.

11. A device according to claim 10 wherein said compression member has a longitudinal axis and tends to be twisted as a vehicle wheel rolls thereover; and said spring means includes a pair of elongated springs having opposite ends which are connected to said one end of said compression member and the stationary support at locations generally diametrically opposed relative to and radially spaced outwardly from the longitudinal axis of said compression member and which untwists said compression member as it is returned to a ready condition.

* * * * *